US005642102A

United States Patent [19]

Panther et al.

[11] Patent Number: 5,642,102

[45] Date of Patent: Jun. 24, 1997

[54] PAGER WITH AUTOMATIC DETECTION OF INSERTION INTO HOLSTER

[75] Inventors: Gyles Panther, Stittsville; J. Peter Williams, Munster, both of Canada

[73] Assignee: Silcom Research Limited, Kanata, Canada

[21] Appl. No.: 407,100

[22] Filed: Mar. 20, 1995

Related U.S. Application Data

[62] Division of Ser. No. 974,438, Nov. 12, 1992, abandoned.

[30] Foreign Application Priority Data

Nov. 12, 1991 [CA] Canada .................................. 2055264

[51] Int. Cl.[6] .................................................. H04Q 1/00

[52] U.S. Cl. .................................. 340/825.44; 455/158.2

[58] Field of Search ......................... 340/825.44, 825.31, 340/825.34, 311.1; 455/158.2

[56] References Cited

U.S. PATENT DOCUMENTS

| | | | |
|---|---|---|---|
| 4,817,194 | 3/1989 | Andros | 455/158.2 |
| 4,990,906 | 2/1991 | Kell | 340/825.31 |
| 5,014,046 | 5/1991 | Minami | 340/311.1 |
| 5,043,721 | 8/1991 | May | 340/825.44 |
| 5,398,023 | 3/1995 | Murray | 340/825.44 |
| 5,428,350 | 6/1995 | Kurcbart | 340/825.44 |

FOREIGN PATENT DOCUMENTS

| | | |
|---|---|---|
| 2039427 | 9/1991 | Canada . |
| 2227350 | 7/1990 | United Kingdom . |

*Primary Examiner*—Brian Zimmerman
*Attorney, Agent, or Firm*—Pascal & Associates

[57] ABSTRACT

A holster for a radio pager contains an electrical element which can be detected by the matching radio pager when the pager is inserted into the holster. In one embodiment the pager and holster have matching electrical contacts which are made when the pager is inserted into the holster. The pager contains means to sense the connection of a specific impedance and to convey this data to an internal control device. The control device has the capability to alter the mode of alert from vibrate to an alternate alert mode such as audible alert, according to the pre-selected choice of the user, under control of the low impedance sense signal. The holster sense circuit output is also used by the control device to invert the orientation of displayed information, to provide for on-belt reading of a front faced display pager.

10 Claims, 9 Drawing Sheets

Figure 1:
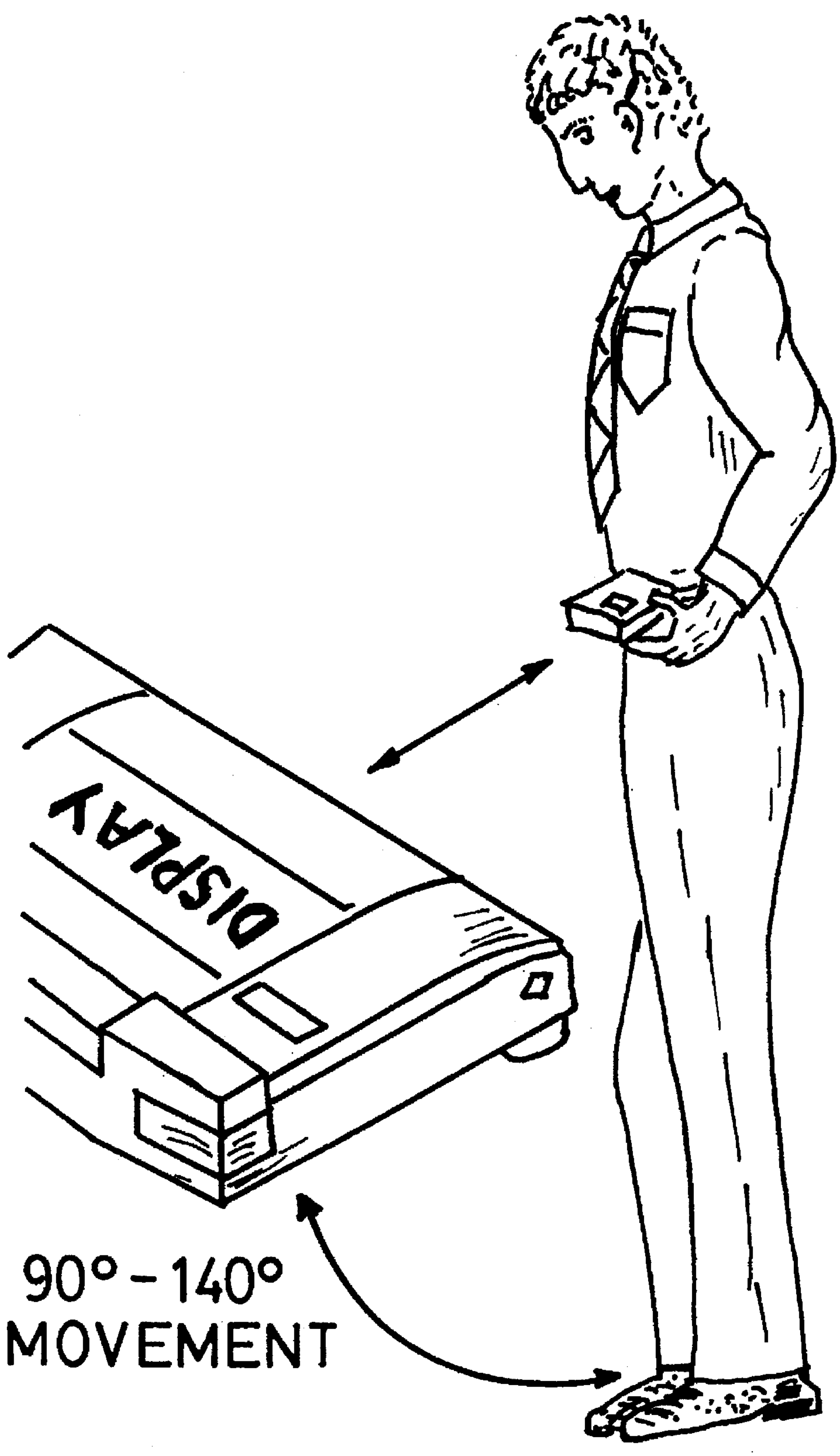

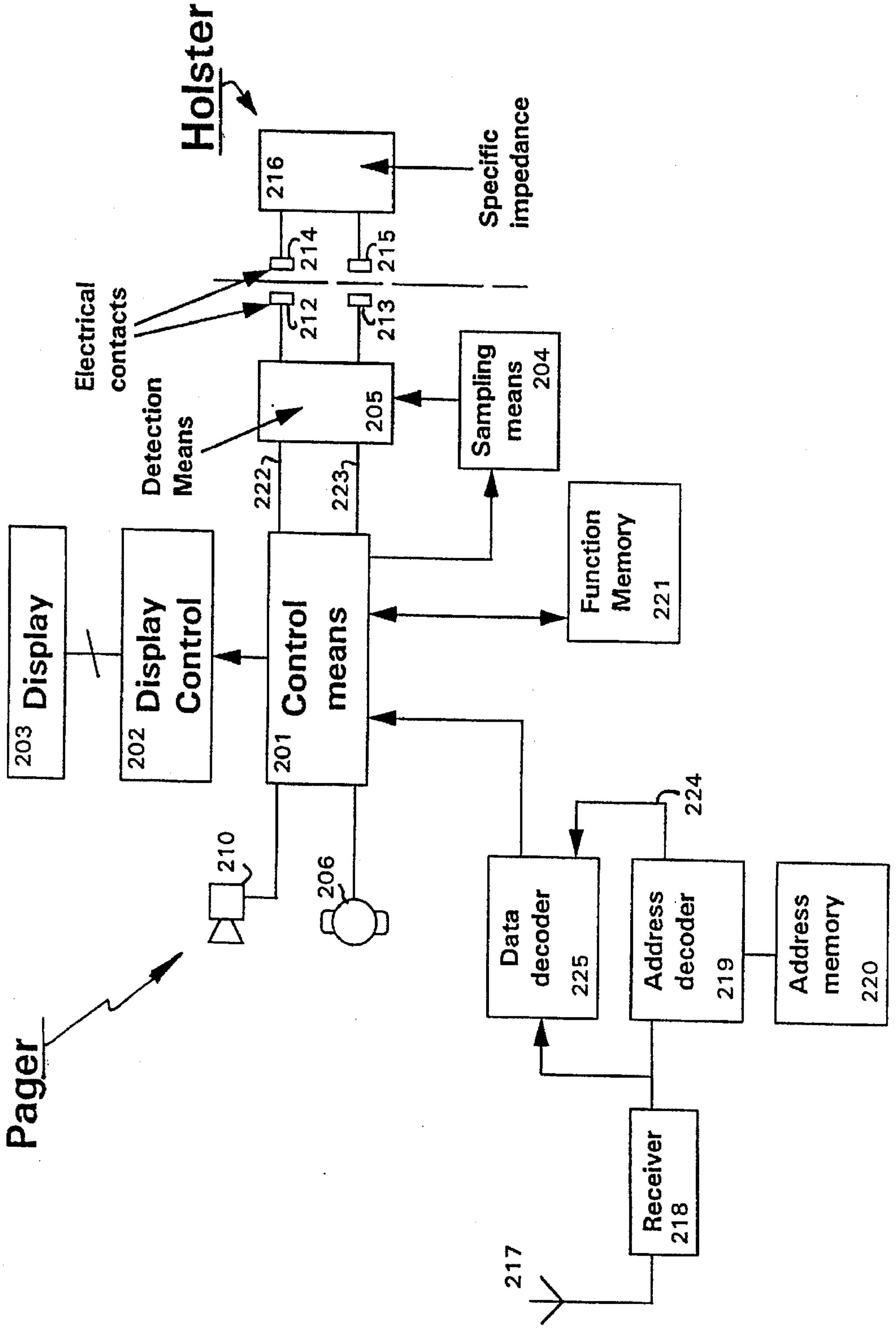
Fig. 2 (a) Holster detection - specific impedance

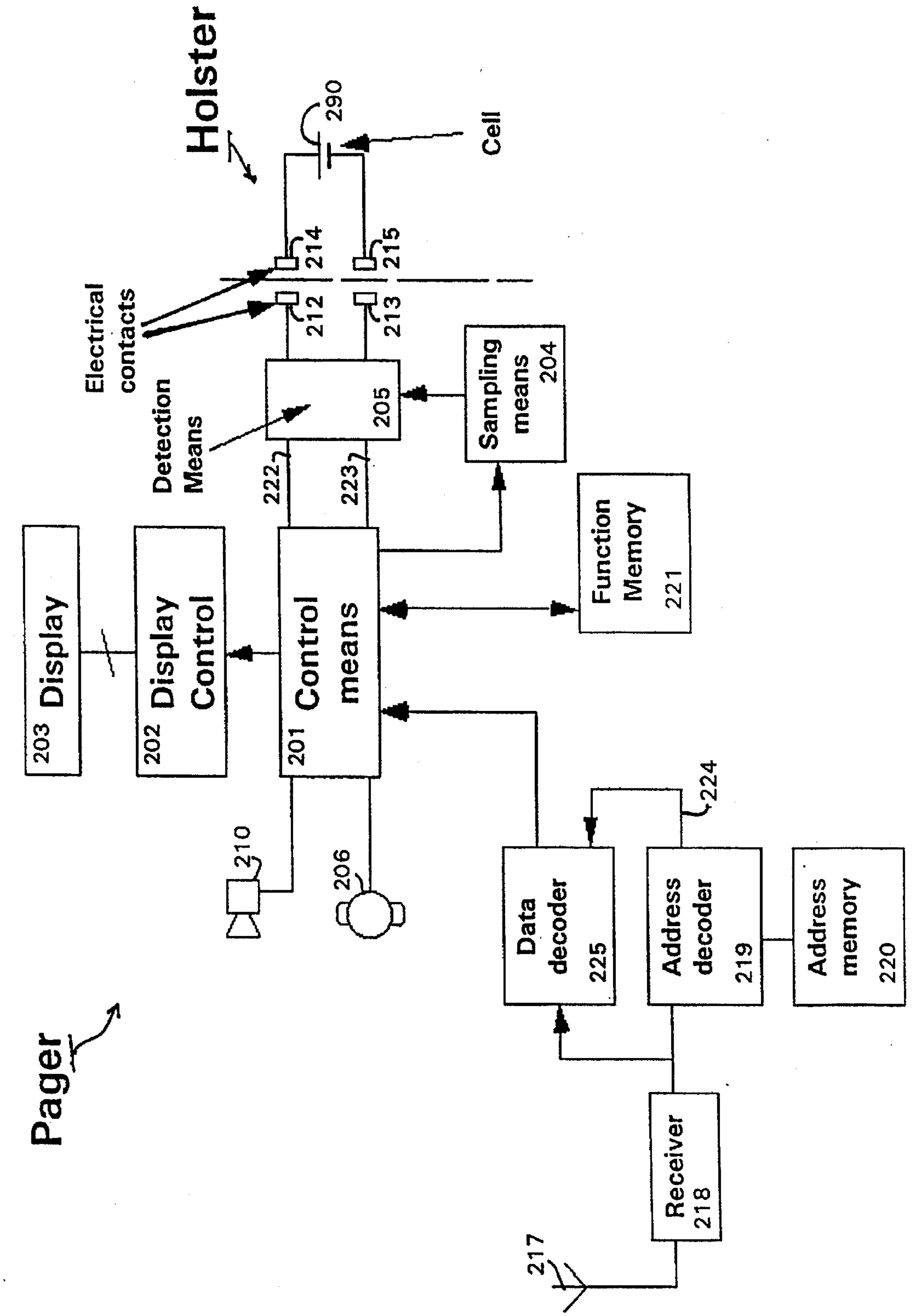
Fig. 2 (b) Holster detection - Voltage source

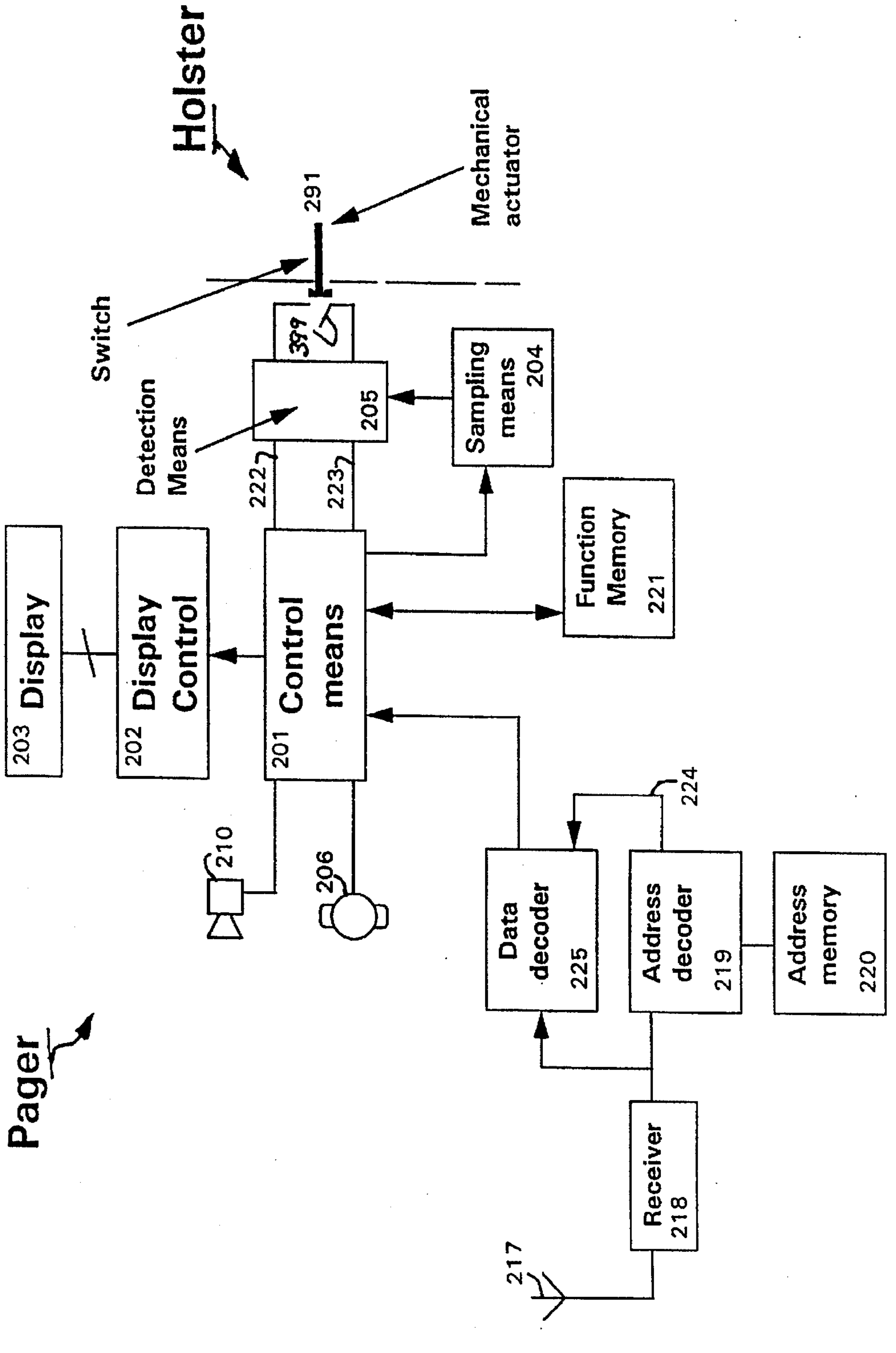
Fig. 2 (c) Holster detection - mechanical actuator

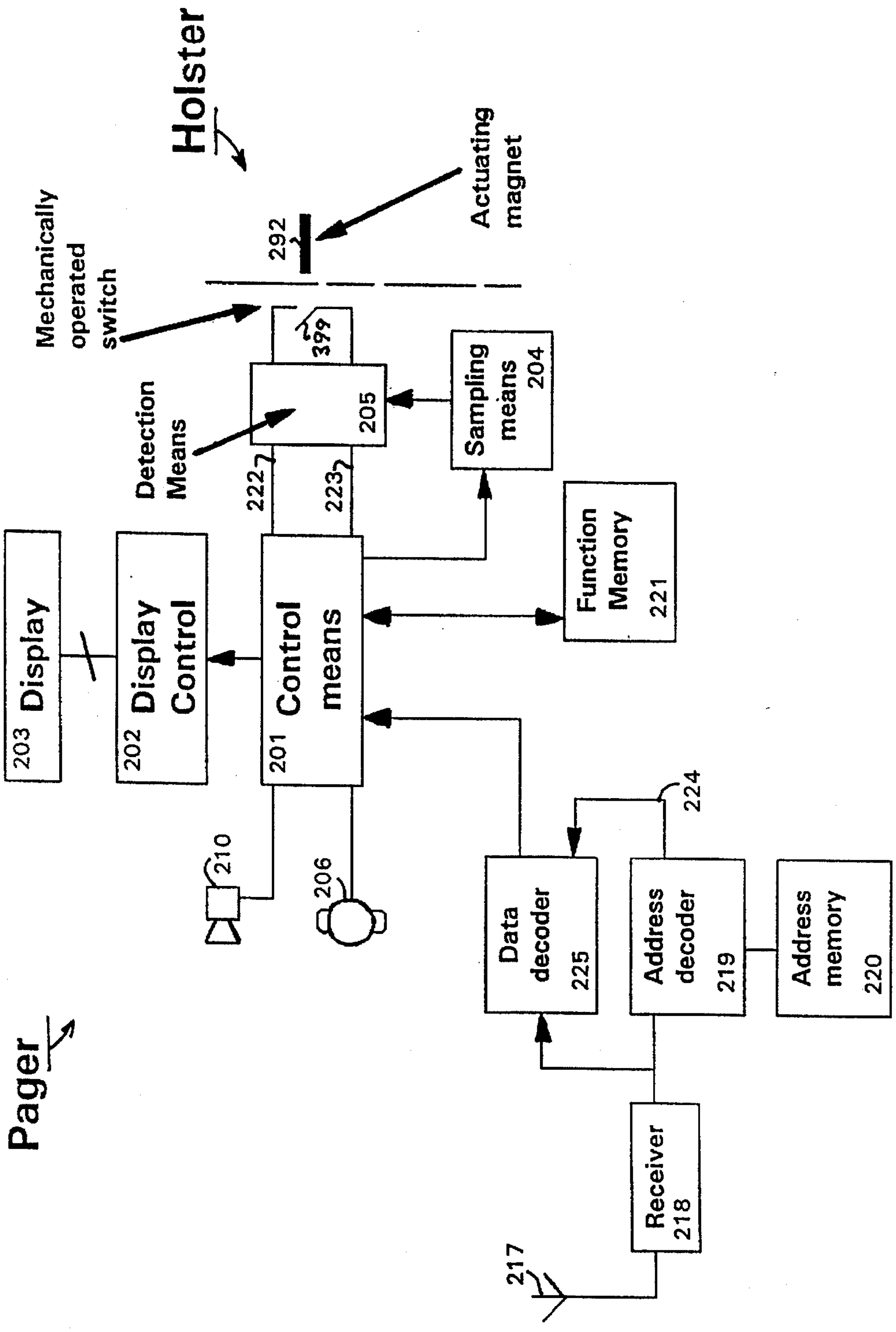
Fig. 2 (d) Holster detection - magnetic switch

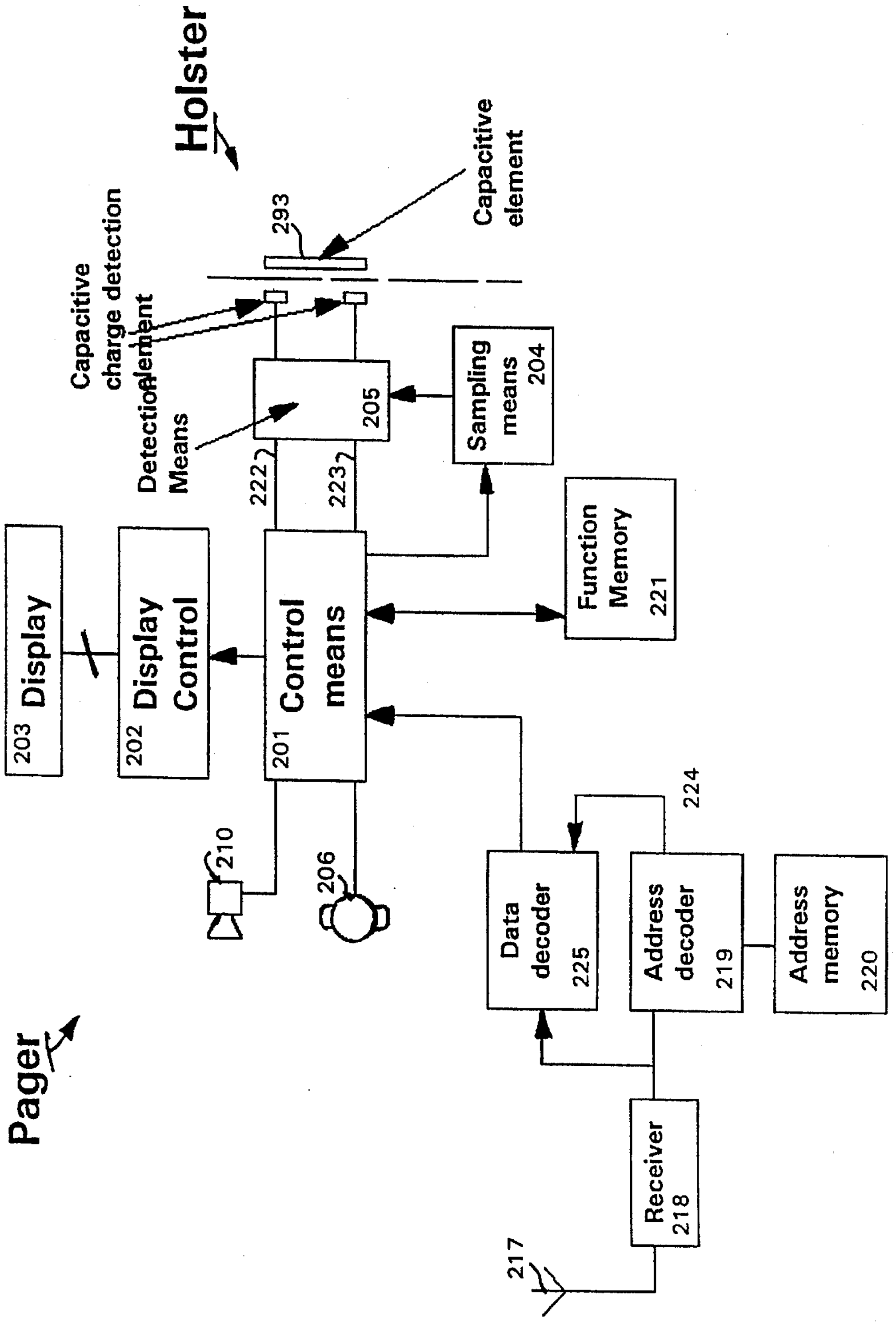
Fig. 2 (e) Holster detection - capacitive element

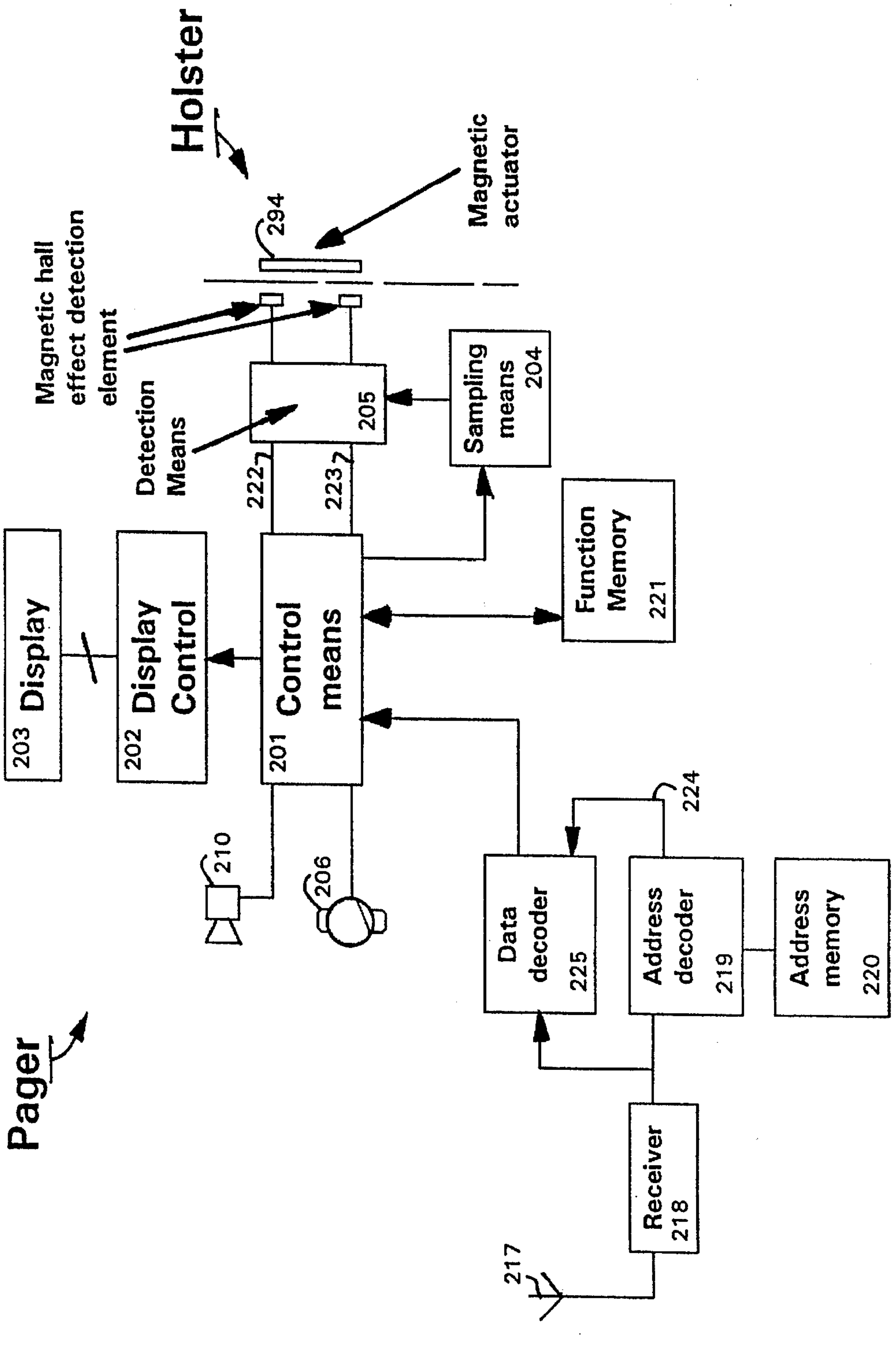
Fig. 2(f) Holster detection - magnetic hall effect

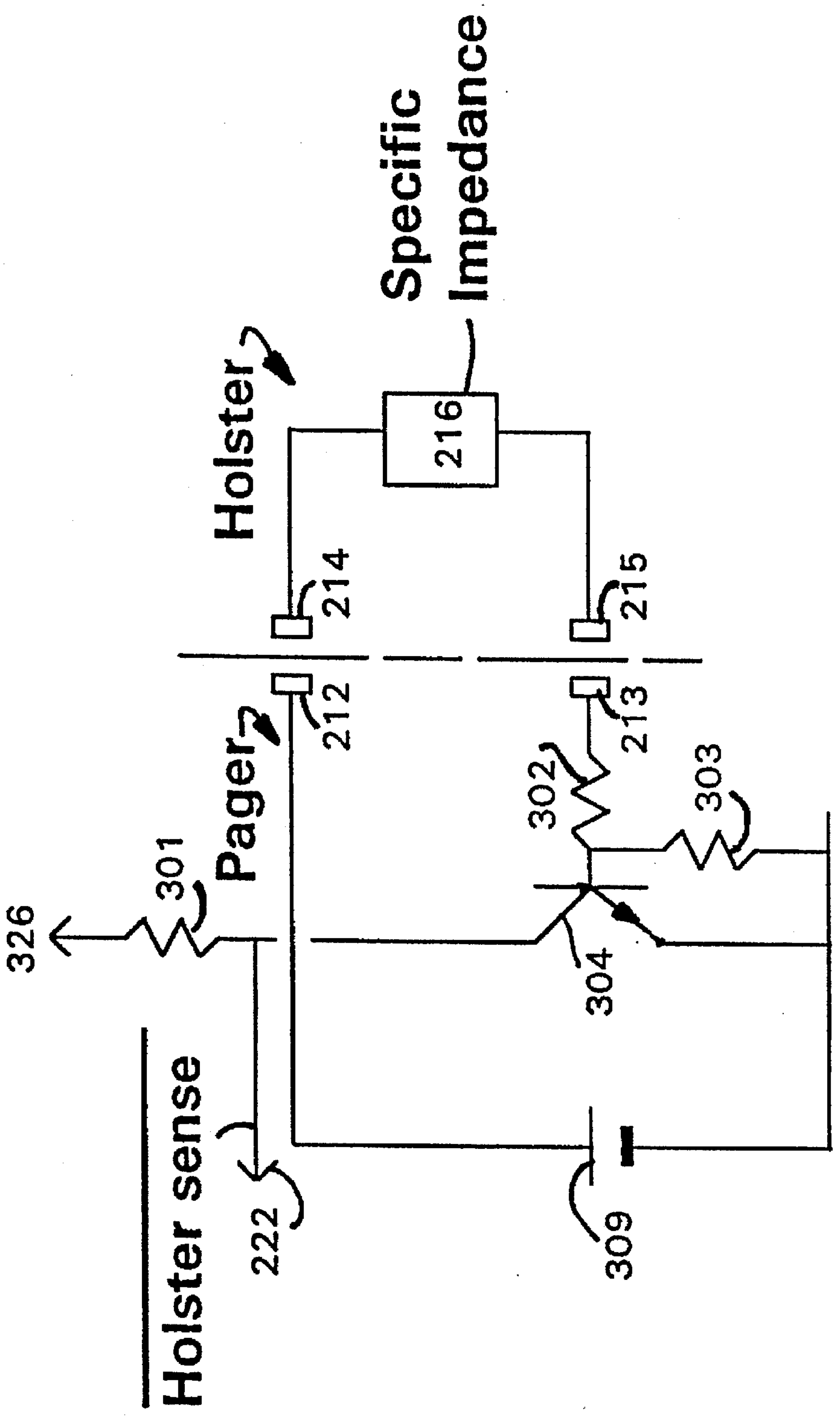
Fig. 3(a). Holster sense circuit

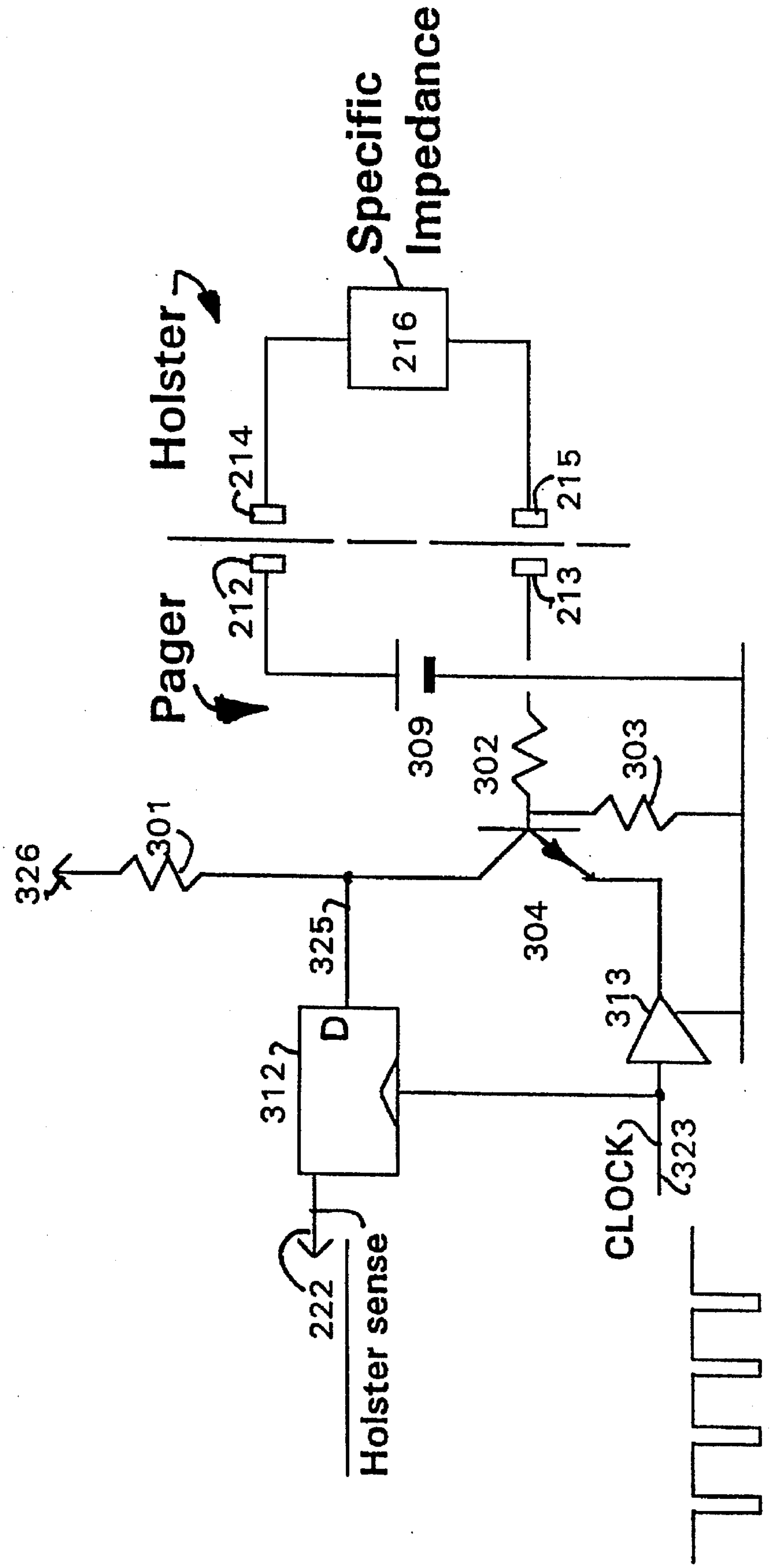
Fig. 3(b). Sampling method for holster sensing

PAGER WITH AUTOMATIC DETECTION OF INSERTION INTO HOLSTER

This application is a division of U.S. application Ser. No. 07/974,438 filed Nov. 12, 1992 now abandoned.

FIELD OF THE INVENTION

This invention relates to the field of radio pagers.

BACKGROUND TO THE INVENTION

Vibrators are a commonly used means for providing a silent alert, but may not be convenient in some frequently occurring situations. Consider, for example, the situation where a conventional, holster mounted pager is set to vibrate mode, and an alert is received when the user is in a car. Normally, the user would be alerted by the vibrator and would remove the pager from its holster to read the display. If the user is wearing more than very light clothing, it is commonly very difficult for the user to re-insert the pager into the belt worn holster. Tight mechanical coupling of the pager to the user is required to make the vibrator an effective alerting device. Thus, unless the pager is hand held, or returned to its holster, any subsequent alerts are likely to be missed. Further, the control means provided for changing the alert mode to audible are usually too complex to be undertaken while engaged in another absorbing task such as driving a vehicle.

Displays are commonly used on pagers to provide a capability for the transmission and reception of numeric and/or alpha-numeric messages.

For Numeric message pagers, with the display mounted on the top surface of the pager body, the direction of the pager display can be reversed, depending upon how the pager is carried. For example, pagers mounted in a top pocket offer a reversed display compared with a belt mounted device. In previous models (such as the SilCom SP200 numeric pager) this was accommodated by a means of control which provides for manual selection of the display direction by the user.

The displays of modern alpha numeric pagers are relatively large and are commonly mounted on the front face of the units. A holster with a belt clip is provided on some models so that the user may conveniently remove the pager from the belt mount to read messages. As alpha numeric pagers become smaller, it becomes more convenient for users to wear them such that the display can be read from the belt, without removal from the holster. This can be accommodated by the provision of a holster having a belt clip with a wide rotation angle of the belt clip as shown in FIG. 1. However, when so read, the display is inverted relative to the normal sense of the pager.

SUMMARY OF THE INVENTION

In accordance with the present invention benefits are realized by the inclusion of an automated means of detection of the insertion of a pager into its holster. These relate to changes in the mode of enunciation in or out of the holster and changes to the display orientation, in and out of the holster.

This present invention provides for means of detecting the presence of the pager in the holster and a control means to alter the alert mode under control of the detection signal. Thus a pager set to vibrate mode can revert to an audible beep mode when the pager is removed from the holster. An alternative form of the holster without a detection means provides a means of attachment for use other than on the belt (for example car visor or desk mounted) which would thus cause the pager to beep, even if the pager is set to vibrate.

In accordance with an embodiment of the invention, control circuits, when enabled, cause the display to be inverted if the pager detects it is inserted into the holster described.

Continuous monitoring of a terminal impedance or other means of sensing the holster generally require significant power consumption because of the analog nature of the sensing. An embodiment of the present invention provides means for detecting a specific impedance or analog input voltage at the pager terminals whereby the port is sampled at a high rate relative to normal human actions, but with a low duty cycle for the sensing current and comparator enable so as to reduce the average current consumption. This form of sensing is particularly suitable for paging and other radio equipment that is battery powered.

BRIEF INTRODUCTION TO THE DRAWINGS

A better understanding of the invention will be obtained by reference to the detailed description below, in conjunction with the following drawings, in which:

FIG. 1 is a depiction of how the pager is inserted into a holster,

FIGS. 2(*a*), 2(*b*), 2(*c*), 2(*d*), 2(*e*) and 2(*f*) are schematic diagrams of alternative embodiments of the electrical sensing portion of the invention, FIG. 3*a* is a schematic diagram of a circuit for sensing the presence of the holster, and FIG. 3*b* is a schematic diagram of another circuit for sensing the presence of the holster.

DESCRIPTION OF THE INVENTION

A first aspect of the invention is a means for the pager to automatically detect the presence of the holster.

FIG. 2(*a*) is a block diagram of a pager embodying the present invention. In FIG. 2(*a*) an antenna 217 receives a signal that is coupled to a receiver 218 that is subject to the control of the control means 201. Receiver 218 has outputs to address decoder 219 and data decoder 225. The address decoder 219 compares received address data with address data stored in the address memory 220. If a valid address is decoded the pager has been called and the address decoder enables the data decoder 225 by an active signal 224. Data decoded by the data decoder is coupled to the control means 201. The control means 201 decodes the received data and forwards this data to the display control 202 which displays this data on the display 203. The control means 201 uses data stored in the function memory 221 to determine what alerting action is required associated with the receipt of valid data. The data in the function memory 221 is programmed with default values at the time the pager is activated and can be modified by user input. The detection means 205 is coupled to physical contacts on the pager 212 and 213 these contacts connect with the pager holster which embodies physical contacts 214 and 215. A device with a specific electrical impedance 216 is connected to contacts 214 and 215. The presence of the specific impedance 216 is detected by the detection means 205 and coupled to the control means 201 by the signal 222. The operation of the detection means 205 is enabled by the control means with signal 223.

Receipt of data from the data decoder 225 causes the control means 201 to alert the pager user of the incoming message. The function memory 221 contains data which determines how the control means will operate the alerting devices in the pager. In this preferred embodiment of the invention there are three types of alert, (1) mute which causes no audible or mechanical alert, (2) audible alert which causes the control means 201 to generate an oscillation which is coupled to the loudspeaker 210, (3) silent alert which causes the control means 201 to activate the vibrator 206. Both alert types (2) and (3) can be also activated together if determined by the data in the function memory 221.

The control means couples the data from the data decoder 225 to the display control 202 which is programmed to display this data on the display 203.

FIG. 3(*a*) is a schematic diagram of one embodiment the detection means 205. One embodiment of holster described in this invention will provide a specific impedance 216 across the holster contacts 214 and 215. A current is generated across the specific impedance 216 by a voltage supplied from the source 309 in the pager via contacts 212 and 213 connected to the pager via contacts 214 and 215. The current at the junction of resistors 302 and 303 causes to the NPN transistor 304 to conduct current to ground from the supply source 326 via the load resistor 301 which generates the low voltage level signal holster sense 222. This holster sense 222 is coupled to the control means 201 as shown in FIG. 2(*a*). Other circuits can be devised to meet the same objective.

A limitation of this circuit is that the sensing current and transistor bias current are continuous if the holster is connected and thus constitutes an additional drain on the battery used to power the pager. This maybe satisfactory for some designs. In FIG. 3(B) an alternative circuit is shown which will provide a means to generate the holster sense 222 and reduce the current used. The circuit shown in FIG. 3(*b*) differs from the above circuit description of FIG. 3(*a*) by the addition of components 312 and 313 which modify the detection means as follows. The emitter of the NPN transistor 304 is driven by an amplifier 313. A low duty active low clock signal 323 provides input to amplifier 313 and the clock input of flip-flop 312. A low clock signal 323 causes the amplifier to ground the emitter of the NPN transistor 304 and latches the detection signal 325 in the flip-flop 312. Therefore as described above for FIG. 3(*a*) when the holster with the specific impedance 216 is placed across the pager contacts 212 and 213 bias current will flow during the active low periods of the clock signal 323 causing the collector of the NPN transistor 304 to be a low voltage level. On a positive transition the flip-flop 312 is clocked at the same time that the drive is removed from the emitter of the NPN transistor 304 by the amplifier 313, and subject to proper timing, the logical state of the detection signal 325 at the end of the sample period of the clock 323 is latched into the flip-flop 312 which generates a holster sense signal 222. In a specific embodiment of the invention, the duty cycle is 80 microseconds of sample time, in a 1 millisecond period, thus providing a power saving of approximately 12:1, but could be more or less without altering the function. There exists many alternate circuit configurations to realize this function.

The output of the detection means, the holster sense 222 is passed to the control device 201 in order that the behavior of the pager may be modified depending upon the detection state.

FIG. 2(*b*) shows how the holster can be detected by means of an external voltage source mounted in the holster.

FIG. 2(*c*) and 2(*d*) shows how the holster can be detected by means of a switch 399 mounted in pager which is activated either by a mechanical actuator 291 or activation by magnetic force generated by a magnet 292 mounted in the holder.

FIG. 2(*e*) shows how the holster can be detected by means of a capacitive charge element 293.

FIG. 2(*f*) shows how the holster can be detected by means of a magnetic hall effect device 294.

Another aspect of the invention relates to the automatic change in the method of alerting the user of the pager, depending upon the output state of the holster sensing circuit.

In the preferred embodiment, the user may select the alerting mode of the pager both in and out of the holster. If the pager is set to silent alert (i.e. vibrate mode) and the pager is in the holster, the pager will detect the presence of the holster and so respond. If the pager is not in the holster, the pager senses this and enunciates any received pages by the means selected as the alternate when out of the holster. This has significant advantages in normal use since the vibrate mode is of very limited effectiveness when the pager is removed from the belt.

The alternative forms of alert can include normal beep patterns at a number of different sound levels, short "pips" or visual alerts using indicator lamps or a pattern on the liquid crystal display.

A second form of the holster can be produced, which would be very similar to the detectable holster but which would not contain detectable means within the holster. When attached to a convenient support (such as a car visor) the holster would provide a convenient means of support. The absence of detectability of the second form of holster would cause the pager to select the alternate alert mode (i.e. not vibrate). In common usage this would probably be the audible beep mode, and the pager would thus provide audible alerting when the pager is housed in this second form of holster.

A third aspect of the invention relates to the automatic inversion of the display while the pager is in the holster so that the user may read the message from the belt. In the preferred embodiment, the pager holster belt clip has a wide angle opening such that the holster, still containing the pager, can be rotated so as to make the pager display clearly visible to the user while still attached to the belt (see FIG. 1). From this viewing perspective, the user is viewing the pager display upside down relative to the normal pager orientation. To provide for on-belt reading of the display, the pager will detect the presence of the detectable form of the holster as described above. If the option is selected in the set-up menus available to the user, the pager display will invert when the pager is inserted into the detectable holster, and revert to normal orientation when withdrawn. Thus messages can be conveniently be read in either direction.

We claim:

1. A holster for a radio pager having a display, comprising means for detecting the presence of the pager in the holster, and means for electronically inverting characters displayed on the display in response to said detection.

2. A holster as defined in claim 1 further including means for inverting said characters in response to a control signal.

3. A holster as defined in claim 2 including means for inverting said characters or icons in response to a rotation of the pager from a position parallel to a body of a user to a position in which the display faces upwardly for viewing by the user whereby at least part of the control signal is generated.

4. A holster as defined in claim 2 including means for generating the control signal in response to the closing of a push button switch on either the pager or the holster by a user.

5. A holster as defined in claim 2 in which the detecting means includes a low duty cycle sampling or strobing means.

6. A method of using a radio pager comprising detecting whether the pager is being carried in an outwardly facing direction, and electronically inverting characters displayed on the display in the event the pager is being carried in the outward facing position.

7. A method as defined in claim 6 in which the inverting step is carried out only upon rotation of the pager from the outward position to a position in which the display faces upwardly.

8. A method as defined in claim 7 in which the detecting step is carried out by detecting whether the pager has been inserted into a holster.

9. A holster and radio pager system comprising a radio pager having a display, means for detecting the presence of the pager in the holster, the pager comprising means for automatically electronically inverting characters displayed on the display in response to said detection.

10. A method of operating a radio pager comprising placing a pager having an electronic display in a holster, detecting the presence of the pager in the holster, and in response to the detection automatically inverting characters displayed on the display.

* * * * *